UNITED STATES PATENT OFFICE.

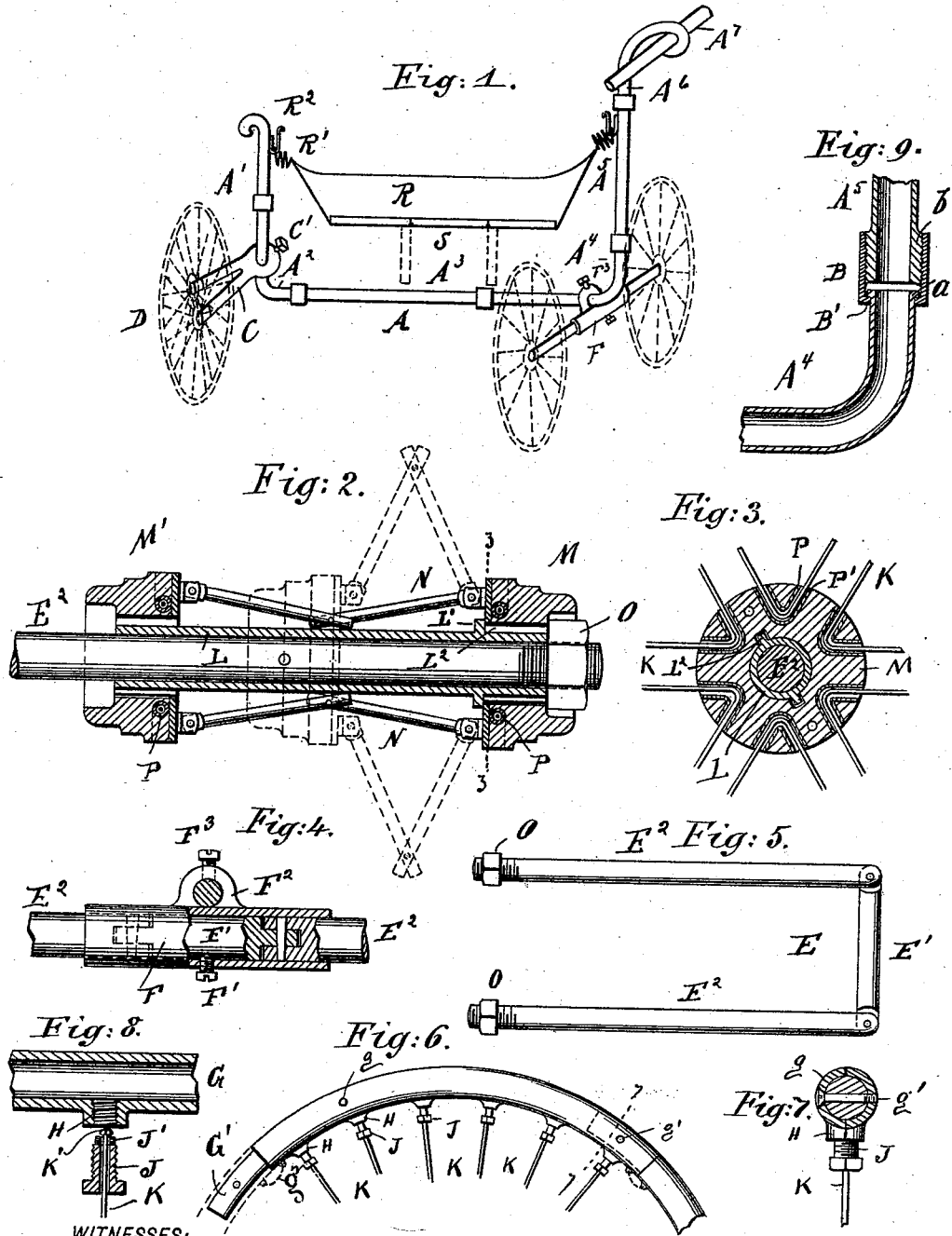

HENRY ANHALTZER, OF NEW YORK, N. Y.

FOLDING BABY-CARRIAGE.

SPECIFICATION forming part of Letters Patent No. 526,958, dated October 2, 1894.

Application filed January 5, 1894. Serial No. 495,810. (No model.)

*To all whom it may concern:*

Be it known that I, HENRY ANHALTZER, a subject of the Emperor of Austria-Hungary, and a resident of the city, county, and State of New York, have invented certain new and useful Improvements in Folding Baby-Carriages, of which the following is a specification.

The object of my invention is to provide a baby carriage which can readily be taken apart and folded very compactly and packed in a box, and the parts of which can readily be assembled for use.

The invention consists in a baby carriage constructed with a folding frame or backbone, folding wheel-supports, folding wheels and a folding rod.

The invention further consists in a folding wheel having flexible spokes secured in a hub and having their outer ends secured in the rims, composed of separable sections.

The invention also consists in the construction and combination of various parts and details as will be fully described and set forth hereinafter and finally pointed out in the claims.

In the accompanying drawings, Figure 1 is a perspective view of my improved baby carriage erected, parts being shown in dotted lines. Fig. 2 is a vertical longitudinal sectional view of the hub of the wheel, parts being shown in different positions in dotted lines. Fig. 3 is a vertical transverse sectional view through the hub, on the line 3 3, of Fig. 2. Fig. 4 is an enlarged detail view of the central part of the axle, parts being broken out and others in section. Fig. 5 is a view of the axle partially folded. Fig. 6 is a side-view of part of the rim of the wheel and spokes. Fig. 7 is an enlarged detail cross-sectional view of the wheel rim, on the line 7 7, of Fig. 6. Fig. 8 is an enlarged detail longitudinal sectional view of part of the wheel rim, showing the manner of securing the spokes, and Fig. 9 is an enlarged detail sectional view of part of the back-bone of the vehicle.

Similar letters of reference indicate corresponding parts.

The vehicle frame is composed of a U-shaped back-bone A composed of the front end-section A', the front L-shaped section A², the intermediate section A³, the rear L-shaped section A⁴, the rear upright section A⁵ and the top curved section A⁶, which forms an eye for receiving the transverse handle-bar A⁷. The several sections each have one end provided with a flange $a$, as shown in Fig. 9, and the other end provided with an external screw-thread $b$. On said screw-thread $b$ an internally-threaded sleeve B is screwed, which is provided at one end with an internal flange B' that engages the flange $a$ of the adjacent section. By screwing said sleeve up on the screw-threaded end of the adjacent section the ends of the sections are drawn toward each other and firmly connected.

To disconnect the sections, all that is necessary is to unscrew the sleeve B of one section from the threaded end $b$ of the adjacent section. On the front L-shaped section A² of the back-bone a fork C is held by means of a binding-screw C', and in said fork the front wheel D is mounted.

The rear axle E is composed of the central section E' and the two end-sections E² hinged to the section E' by knuckle-joints, so that the sections E' E² E² can be extended to form a straight axle. For the purpose of locking the parts of the axle in place when so extended, a sleeve F is provided, which is of greater length than the central section E'. The sleeve is moved longitudinally on the axle until it is centrally on said central section and then overlaps the knuckle-joints between the central section and the two end-sections, as shown in Fig. 4. This sleeve is then locked in place by means of a binding-screw F'. On the center of the sleeve F is an eye F², through which the rear L-shaped section A⁴ of the back-bone is passed, and which eye is locked on said section A⁴ of the back-bone by means of the binding-screw F³.

The wheels are constructed in the following manner: The rim is composed of a series of segmental sections G, which are made hollow and composed of two half round sections $g$ (Fig. 7), united at suitable intervals by screws $g'$. One end of each section is left open and into the other end a stem G' is inserted, which stem is of such diameter that it can fit into the open end of the adjacent section. The adjacent sections of the rim are connected by means of chains $g^2$, as shown in dotted lines in Fig. 6, to prevent their becoming entirely detached. The rim is provided at regular intervals on its inner surface with internally screw-threaded necks H, into which the nuts J can be screwed, that are provided with a longitudinal bore, and on the upper ends of the nuts the washers J' rest.

The spokes K are composed of chains, fine wire or cat-gut and are passed through the bores of the nuts J and provided with a knot or head K' above the washer J'. To attach the spokes to the rim the nuts J are screwed into the necks H. The center of the wheel is composed of a sleeve L fitting on the axle, on which sleeve are mounted the two hubs M M', the inner hub M' being mounted to slide on the sleeve L, which hubs M M' are connected by the toggle-levers N.

The wheel center when placed on the axle is held in place by the nut O screwed on the threaded end of the axle, the inner end of the hub M resting against the annular shoulder L' of the sleeve L. Each hub is provided with a series of V-shaped apertures P provided with tubular linings P'. The cat-gut, wire or chain spokes K are passed through said linings P', as shown in Fig. 3, and are then drawn taut by screwing up the nuts J. The hubs M M' have longitudinal grooves for receiving the splines or keys $L^2$ on the sleeve L.

The body of the vehicle is composed of a hammock R, made of netting or of any fabric, provided at each end with a spring R', by means of which it is suspended from the hooks $R^2$ on the back-bone or frame of the vehicle. A folding bottom S is placed in the bottom of the hammock and on the same the mattress or cushion for the child is placed. The bottom S when removed from the hammock can be folded to form a box by swinging up its ends, as shown in dotted lines in Fig. 1, and into the box or frame thus formed the several parts of the baby carriage when taken apart and folded can be placed for transportation.

To erect the carriage for use, the several sections of the back-bone are connected, the front fork C and the rear axle are applied, and the hammock is suspended from the back-bone in the manner described. To erect the wheels, the stems G' on the ends of the rim sections G are passed into the open ends of adjacent sections, so as to form a single ring. The hubs M M' are moved from each other by folding the knuckle-joints of the toggle-levers N toward the sleeve L, as shown in Fig. 2, and then the wheels are applied to the axles and locked in place by means of the nuts O. To fold the wheels, the knuckle-joints of the toggle-levers are raised, as shown in dotted lines in Fig. 2, whereby the hub M' is moved toward the hub M. The sections of the rim can then be taken apart and folded very compactly. As the knots or heads K' on the ends of the nuts J do not rest on the turning ends of the nuts but on the washers J', they are not injured or cut by turning the nuts and the spokes are not subjected to torsional strains.

Having thus described my invention, I claim as new and desire to secure by Letters Patent—

1. A baby carriage constructed with a frame or back-bone, composed of a series of separable parts and having upwardly-projecting parts at the front and rear, a handle held in the upper end of the rear upwardly-projecting part, a detachable rear axle on said frame, a detachable fork on the front of the same and detachable folding wheels mounted on said axle and in said fork, substantially as set forth.

2. A folding baby carriage, constructed with a frame or back-bone composed of separable sections having flanged ends, flanged screw-couplings uniting the several sections, detachable wheel-supports on said frame or back-bone and folding wheels mounted on said wheel-supports, substantially as set forth.

3. In a folding baby carriage, the combination with a back-bone or frame, of an axle composed of three rods connected by knuckle-joints, a sliding sleeve on said axle, which sleeve serves for holding the parts thereof in line, means for locking said sleeve in place, an eye on said sleeve through which part of the frame or back-bone passes, and means on said sleeve for locking the same to the frame or back-bone, substantially as set forth.

4. In a folding baby carriage, the combination with a back-bone composed of a series of detachable parts, that are connected end to end, of detachable wheel supports held on said back-bone, detachable wheels mounted on said supports, which wheels have separable rims, flexible spokes and expansible hubs and a folding vehicle body suspended from said frame, substantially as set forth.

5. A folding wheel constructed with an expansible hub, a rim composed of detachable segmental sections and flexible spokes attached to the section of the expansible hub and to the sections of the rim, substantially as set forth.

6. A folding wheel, having its hollow rim formed of a series of segmental sections, each section composed of two semi-circular pieces united by screws, a stem in one end of each segmental section, which stem fits in the open end of an adjacent rim-section, substantially as set forth.

7. In a folding-wheel, the combination with a rim formed of a series of segmental sections, having screw-necks projecting from the inner edges, nuts screwed in said necks, flexible spokes having their necks in said nuts and expansible hubs to which the flexible spokes are attached, whereby said spokes can be drawn taut by expanding the hub, substantially as set forth.

8. In a folding-wheel, the combination with a rim formed of a series of detachable sections, each having screw-necks projecting from its inner edge, nuts to be screwed into said necks, which nuts have longitudinal bores, washers on the inner ends of the nuts, flexible spokes having their ends passed through the bores of the nuts and the washer and having a head resting on the washer and a hub for holding said flexible spokes, substantially as set forth.

9. In a folding-wheel, the combination with an expansible hub, composed of two sections united by articulated members, each hub-section having V-shaped apertures, flexible spokes passed through said apertures and held therein, a wheel-rim formed of detachable sections, to which the free ends of the spokes are fastened, substantially as set forth.

10. In a folding wheel, the combination with a sleeve, of two hubs on the same, toggle-levers connecting the hubs, flexible spokes attached to the hubs, and a wheel rim composed of separable sections, to which wheel rim sections the outer ends of the spokes are applied, substantially as set forth.

In testimony that I claim the foregoing as my invention I have signed my name in presence of two subscribing witnesses.

HENRY ANHALTZER.

Witnesses:
OSCAR F. GUNZ,
ABRAHAM EICHEL.